US012155130B2

(12) United States Patent
Majkowski et al.

(10) Patent No.: US 12,155,130 B2
(45) Date of Patent: Nov. 26, 2024

(54) ADAPTIVE TUNABLE ANTENNA

(71) Applicant: L3Harris Global Communications, Inc., Melbourne, FL (US)

(72) Inventors: Joseph Majkowski, Pittsford, NY (US); Malcolm Packer, Hillsborough, NC (US); Luismael Lopez Aragones, Webster, NY (US)

(73) Assignee: L3Harris Global Communications, Inc., Melbourne, FL (US)

( * ) Notice: Subject to any disclaimer, the term of this patent is extended or adjusted under 35 U.S.C. 154(b) by 286 days.

(21) Appl. No.: 17/974,201

(22) Filed: Oct. 26, 2022

(65) Prior Publication Data

US 2024/0145920 A1 May 2, 2024

(51) Int. Cl.

| | |
|---|---|
| ***H01Q 5/50*** | (2015.01) |
| ***H01Q 1/08*** | (2006.01) |
| ***H01Q 1/12*** | (2006.01) |
| ***H01Q 1/36*** | (2006.01) |
| ***H01Q 5/321*** | (2015.01) |
| ***H01Q 5/335*** | (2015.01) |
| ***H01Q 9/32*** | (2006.01) |
| ***H01Q 21/30*** | (2006.01) |

(52) U.S. Cl.

CPC ............... *H01Q 5/50* (2015.01); *H01Q 1/085* (2013.01); *H01Q 1/1207* (2013.01); *H01Q 1/362* (2013.01); *H01Q 5/321* (2015.01); *H01Q 5/335* (2015.01); *H01Q 9/32* (2013.01); *H01Q 21/30* (2013.01)

(58) Field of Classification Search

CPC ...... H01Q 1/085; H01Q 1/088; H01Q 1/1207; H01Q 1/20; H01Q 1/24; H01Q 1/36; H01Q 1/362; H01Q 1/40; H01Q 1/405; H01Q 1/50; H01Q 5/15; H01Q 5/30; H01Q 5/307; H01Q 5/314; H01Q 5/321; H01Q 5/328; H01Q 5/335; H01Q 5/50; H01Q 21/30; H01Q 23/00; H04B 1/0053; H04B 1/0057; H04B 1/006; H04B 1/0064; H04B 1/0346; H04B 1/088; H04B 1/18; H04B 1/3833; H04B 1/401; H04B 2001/3861

See application file for complete search history.

(56) References Cited

U.S. PATENT DOCUMENTS

| | | | |
|---|---|---|---|
| 3,852,759 | A | 12/1974 | Felsenheld et al. |
| 4,554,554 | A | 11/1985 | Olesen et al. |
| 4,862,184 | A | 8/1989 | Ploussios |

(Continued)

OTHER PUBLICATIONS

G. Ploussios and A. Strugatsky, "The ETH (electronically tuned helix) antenna," Proceedings of MILCOM '95, 1995, pp. 1267-1272 vol. 3, doi: 10.1109/MILCOM.1995.483699.

(Continued)

*Primary Examiner* — Robert Karacsony

(74) *Attorney, Agent, or Firm* — Fox Rothschild LLP; Carol E. Thorstad-Forsyth

(57) ABSTRACT

Adaptive tunable antenna system includes a first radiating element having an elongated length and a second radiating element extending from a distal end of the first radiating element. The first radiating element is for a high band of operation and the second radiating element is for a low-band of operation. The second radiating element is a helical member including a plurality of turns. A low-band circuit selectively bypasses one or more of the turns of the second radiating element in response to a control signal.

21 Claims, 5 Drawing Sheets

(56) References Cited

U.S. PATENT DOCUMENTS

| | | | |
|---|---|---|---|
| 4,924,238 | A | 5/1990 | Ploussios |
| 5,081,468 | A | 1/1992 | Williams |
| 5,521,607 | A | 5/1996 | Deasy |
| 5,754,143 | A | 5/1998 | Warnagiris et al. |
| 5,841,407 | A | 11/1998 | Birnbaum |
| 6,169,523 | B1 | 1/2001 | Ploussios |
| 6,501,427 | B1 | 12/2002 | Lilly et al. |
| 8,436,784 | B2 | 5/2013 | Jalali Mazlouman et al. |
| 8,473,017 | B2 | 6/2013 | Milosavljevic et al. |
| 8,570,223 | B2 | 10/2013 | Arslan et al. |
| 10,276,923 | B1 | 4/2019 | Eller et al. |
| 10,749,247 | B2 | 8/2020 | Tornatta, Jr. et al. |
| 2013/0009832 | A1 | 1/2013 | Apostolos et al. |
| 2019/0173179 | A1 | 6/2019 | Lee |

OTHER PUBLICATIONS

S. Jalali Mazlouman, A. Mahanfar, C. Menon and R. G. Vaughan, "A frequency tunable embedded normal-mode helix antenna for portable wireless devices," Proceedings of the 5th European Conference on Antennas and Propagation (EUCAP), 2011, pp. 2230-2234.

S. Zhu et al., "Miniaturized tunable conical helix antenna," 2014 IEEE Radio and Wireless Symposium (RWS), 2014, pp. 100-102, doi: 10.1109/RWS.2014.6830109.

ADAPTIVE TUNABLE ANTENNA

BACKGROUND

Statement of the Technical Field

The technical field of this disclosure concerns wireless communications, and more particularly methods and systems for antennas which are operable over a wide range of frequencies.

Description of the Related Art

The related art concerns methods and systems for antennas that are used in radio communications. Antennas used in portable operations often need to support operations over a wide range of frequencies in the VHF and/or UHF bands. In order to maximize operational effectiveness and minimize power consumption it is important that such antennas efficiently radiate RF energy. However, simple antenna structures such as monopole antennas will usually provide efficient performance over only a relatively narrow frequency range. This frequency range is sometimes referred to as the operational bandwidth of the antenna. Antenna efficiency can be affected by several factors. For example, the physical dimensions of an antenna will usually have a material effect on its efficiency. The physical size or length of an antenna will affect its resonant frequency and it is recognized that antennas often perform more efficiently when operating at or near their resonant frequency.

Another antenna design consideration is impedance match. A transceiver transfers RF power to and from an antenna most efficiently when the input impedance of the antenna is properly matched to the output impedance of the transceiver. However, the input impedance of the antenna will naturally vary as a function of frequency. Accordingly, it can be challenging to achieve impedance matching with an antenna over a wide range of operating frequencies. This can lead to a high voltage standing wave ratio (VSWR) in the antenna feed line at certain frequencies. Adjustable antenna matching circuits disposed between a transceiver and an antenna can provide a mechanism to match the impedance of the antenna to the transceiver.

SUMMARY

This document concerns an adaptive tunable antenna system. The system is comprised of first and second radiating elements. The first radiating element has an elongated length extending from a first proximal end, adjacent to an antenna feed, to a first distal end. The first radiating element can be a tubular member having a central bore extending along the elongated length. In some scenarios, the tubular member is comprised of a gooseneck structure.

The second radiating element extends from the first distal end and is a helical member. The helical member extends along a central axis from a second proximal end of the helical member to a second distal end of the helical member and includes a plurality of spiral turns. In some scenarios, the helical member is disposed within a low-band housing comprising a radome. The system also includes a diplexer configured to frequency multiplex high-band RF energy between the antenna feed and the first radiating element, and low-band RF energy, having a lower RF frequency than the high-band RF energy, between the antenna feed and the second radiating element A low-band circuit of the antenna system can be at least partially disposed in an internal lumen defined by the helical member. The low-band circuit is configured to selectively bypass one or more of the plurality of turns in response to a control signal. The bypassing operation involves coupling low-band RF energy from an end feed point of the second radiating element adjacent the second proximal end, to one or more of the plurality of turns intermediate of the proximal end and the distal end.

A high-band matching circuit can be coupled to a high-band port of the diplexer and to the first radiating element. As such, the high-band matching circuit can facilitate an impedance match between the first radiating element and a transceiver which may be connected to the feed point. In some scenarios, the diplexer and the high-band matching circuit are both disposed in a base housing disposed at the first proximal end of the antenna system.

A shielded transmission line is coupled to a low-band port of the diplexer. The shielded transmission line (e.g., a coaxial transmission line) can extend from the base housing through the central bore of the first radiating element. The shielded transmission line is connected to the low-band circuit. Further, a shield of the shielded transmission line is connected directly to the distal end of the first radiating element.

The antenna system also includes a boundary control unit. The boundary control unit is advantageously disposed along a portion of the shielded transmission line configured and is configured to selectively allow RF energy to be coupled to the low-band circuit in a first condition and prevent coupling of RF energy to the low-band circuit in the second condition.

The low-band circuit is comprised of a low-band control unit. In some scenarios, the boundary control unit can be configured to transition between the first and second condition responsive to the low-band control unit. The low-band control unit can also control a plurality of switches arranged in a switching network. The switches are responsive to the low-band control unit to electrically bypass the one or more turns of the second radiating member. According to one aspect, the plurality of switches are connected sequentially in a series configuration (e.g., a daisy chain configuration). This connection configuration can be advantageously arranged to minimize the occurrence of one or more parasitic reactances associated with the electrical leads which are used to bypass the one or more turns.

The low-band circuit can also include an RF choke connected to a shielded conductor of the shielded transmission line. The RF choke allows the shielded transmission line to be used for coupling a DC supply voltage (e.g., a DC supply voltage from a transceiver) to the low-band circuit for powering the low-band circuit. Further, the low-band control unit can be configured to monitor the DC supply voltage to detect variations in the voltage (e.g., voltage pulses applied to the shielded transmission line by a transceiver). The voltage pulses comprise amplitude and time variations in the DC supply voltage which occur sequentially or serially over time and comprise the control signal used to control the operation of the low-band circuit.

The low-band circuit can also include a low-band matching network. The low-band matching network can be responsive to the low-band control unit. As such, the low-band matching network can facilitate impedance matching of the second radiating element to a transceiver when the transceiver is connected to the antenna feed. Control signals from the transceiver can be used to specify an operating condition or mode of the low-band matching network. In some scenarios, the operating condition or mode can involve setting one or more switch positions in the low-band matching network.

BRIEF DESCRIPTION OF THE DRAWINGS

This disclosure is facilitated by reference to the following drawing figures, in which like reference numerals represent like parts and assemblies throughout the several views. The drawings are not to scale and are intended for use in conjunction with the explanations in the following detailed description.

DETAILED DESCRIPTION

Figure 1:
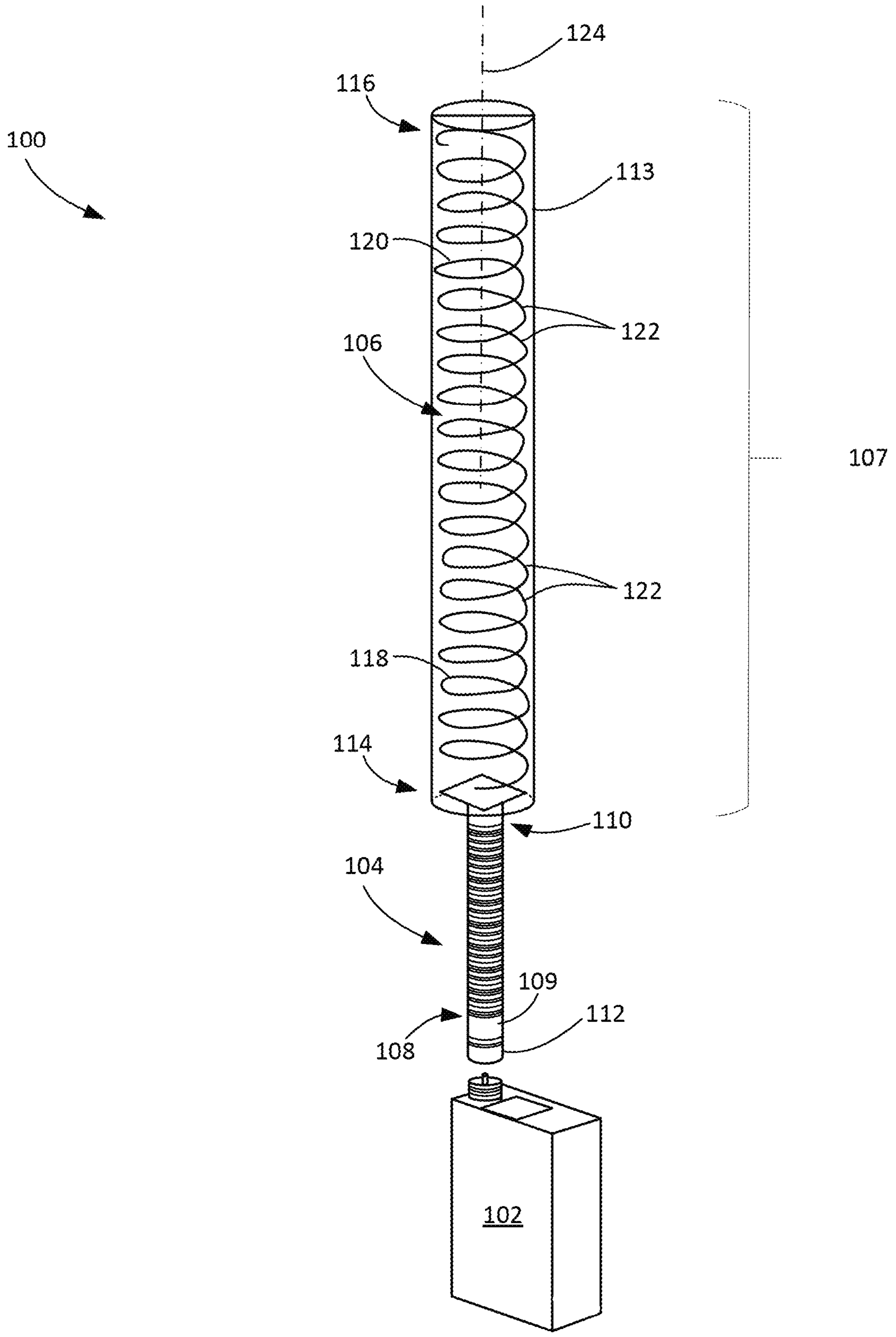
FIG. 1 is a perspective view of an antenna system which is useful for understanding certain embodiments of an antenna system disclosed herein.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. Further, particular features described herein can be used in combination with other described features in each of the various possible combinations and permutations. It is noted that various features are described in detail with reference to the drawings, in which like reference numerals represent like parts and assemblies throughout the several views. While the various aspects are presented in the drawings, the drawings are not necessarily drawn to scale unless specifically indicated.

The methods and/or systems disclosed herein may provide certain advantages in a portable communication system. Portable communication systems in some scenarios can comprise transceiver systems capable of operation on one or more of a low-band (e.g., a VHF band) and a high-band (e.g., a UHF band). Conventional dismount antennas used in portable communication systems are known to suffer from a variety of limitations. For example, conventional folding blade antenna systems are physically obtrusive in their extended state which offers greatest efficiency. Consequently, such antennas are often maintained in their compact folded configuration during use. But use in this condition results in an antenna which has poor overall gain and efficiency. Further, these antennas undesirably allow broadband noise and jammer signals to enter the front end of a transceiver to which they are connected.

An adaptable tunable antenna system shown in FIG. 1 is useful for understanding certain embodiments of an antenna system 100 disclosed herein. The antenna system 100 overcomes many of the limitations of conventional dismount antenna systems and provides substantially improved performance. The antenna system 100 is comprised of two major radiating elements which are referred to herein as the first radiating element 104 and the second radiating element 106. The first radiating element 104 has a proximal end 108 disposed closest to an antenna feed 112 and is the primary radiator used for a high band of operation (e.g., a UHF operating band). In some scenarios, the antenna feed 112 can comprise an RF connector which is configured to allow the antenna to be connected to a transceiver (e.g., transceiver 102). A base housing 109 can be disposed adjacent to the antenna feed 112. The base housing 109 is advantageously configured for housing a base circuit (not shown in FIG. 1) which is described below in further detail in relation to FIG. 2.

The second radiating element 106 is part of an adaptive low-band antenna system 107 which is supported on a distal end 110 of the first radiating element 104 opposed from the proximal end 108. In some scenarios, the second radiating element 106 can be at least partially disposed within a low-band housing 113 which is also supported on the distal end 110 of the first radiating element 104. In such scenarios, the low-band housing 113 may also function as a radome for the second radiating element 106. To facilitate this function, the low-band housing can be advantageously formed from a low-loss dielectric material. The low-band housing 113 can be configured to protect the second radiating element 106 and circuitry contained therein from precipitation and/or impacts which may occur due to the presence of tree branches or structure in an environment in which the antenna system 100 is used.

The second radiating element 106 is advantageously comprised of a helical member 118. The helical member can be formed of an elongated conductor 120 which has been formed into a spiral shape. The helical member 118 is comprised of a plurality of spiral turns 122 which extend along a central axis 124 defined by the helical member. The helical member 118 extends along the central axis 124 from the proximal end 114 of the second radiating element 106 to a distal end 116 of the second radiating element. The low-band housing 113 can in some scenarios comprise an elongated tubular structure having an internal lumen in which the second radiating element is disposed.

Figure 2:
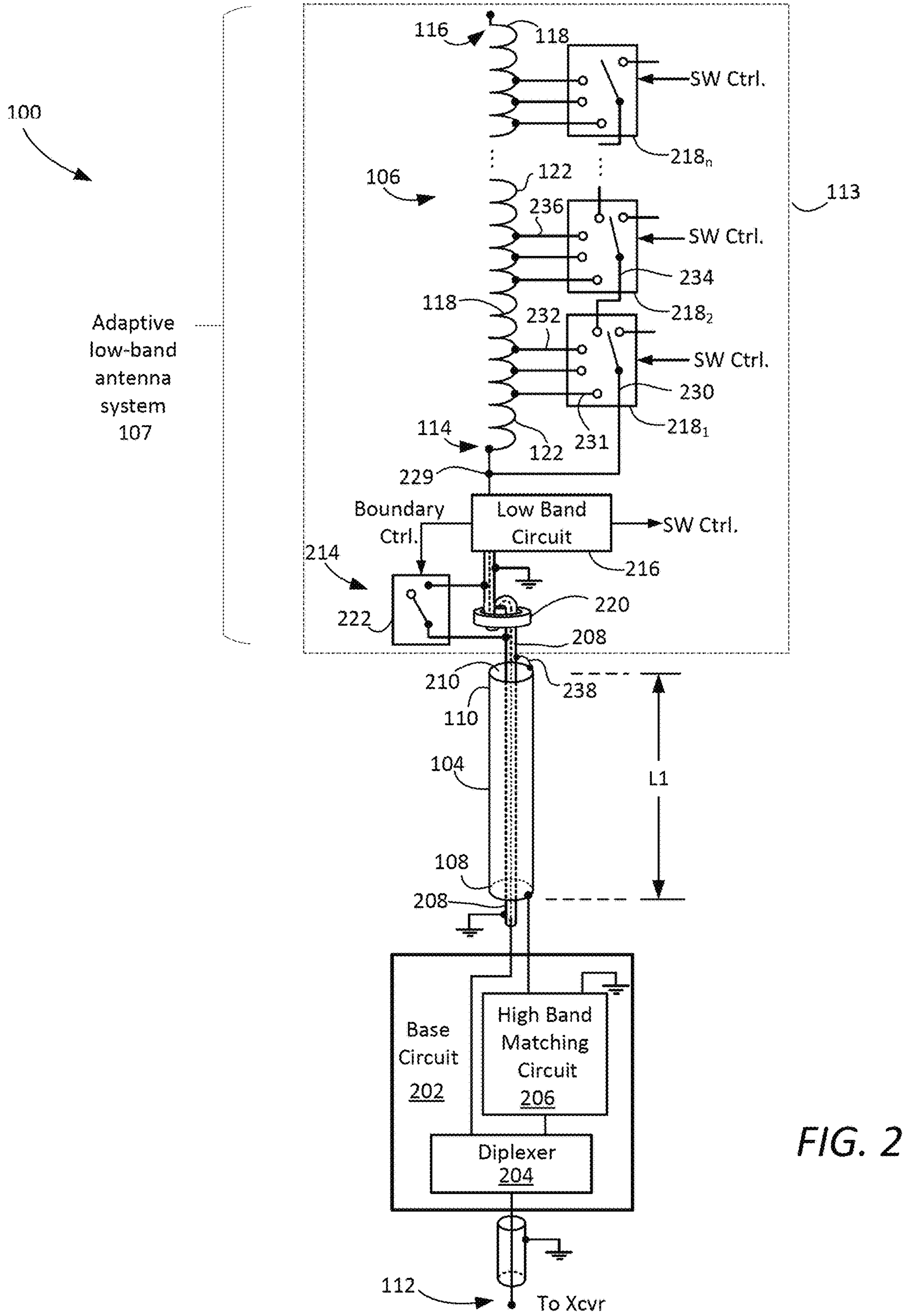
FIG. 2 is a schematic drawing of the antenna system shown in FIG. 1 which is useful for understanding certain embodiments of an antenna system disclosed herein.

Additional details of the antenna system 100 will now be described with reference to FIG. 2. The antenna system 100 includes a base circuit 202 connected to the antenna feed 112. In some scenarios, the base circuit can be disposed within the base housing 109. The base circuit 202 is comprised of a diplexer 204 and a high-band matching circuit 206. The diplexer 204 is configured to route high-band RF signals from the antenna feed 112 to the high band matching circuit 206. The diplexer 204 is a bi-directional element which works in both the transmit and receive direction. Accordingly, the diplexer 204 also routes high-band RF signals from the high-band matching circuit to the antenna feed 112. The diplexer 204 also routes low-band RF signals from the antenna feed 112 to shielded transmission line 208. Further, since the diplexer is a bi-directional element, it also routes low-band RF signals from the shielded transmission line 208 to the antenna feed 112. The exact circuit configuration of the diplexer is not critical provided that it facilitates the foregoing signal routing function.

The high-band matching circuit 206 can comprise one or more reactive components which are arranged to facilitate RF impedance matching between the first radiating element 104 and a transceiver (e.g., transceiver 102) that is connected to antenna feed 112. The output of the high band matching circuit 206 can be connected at or near the proximal end 108 of the first radiation element 104. The exact configuration of the high-band matching circuit 206 is not critical provided that it facilitates an acceptable voltage standing wave ratio (VSWR) at the antenna feed 112 when the antenna system 100 is used with a particular transceiver unit for high-band communications.

The first radiating element 104 is comprised of an elongated conductive member having a length L1. In some scenarios the first radiating element 104 can have a tubular shape which defines an internal lumen 210. The length L1 and the diameter of the radiating element 104 can be selected to facilitate communications on the high-band (e.g., a UHF band) of operation. For example, in some scenarios, the length and diameter can be selected so that the first radiating element 104 has an RF resonant frequency which is at or near a frequency of interest in the UHF band. When configured as described herein, the first radiating element 104 can function as a monopole antenna for high-band communications.

Figure 3:
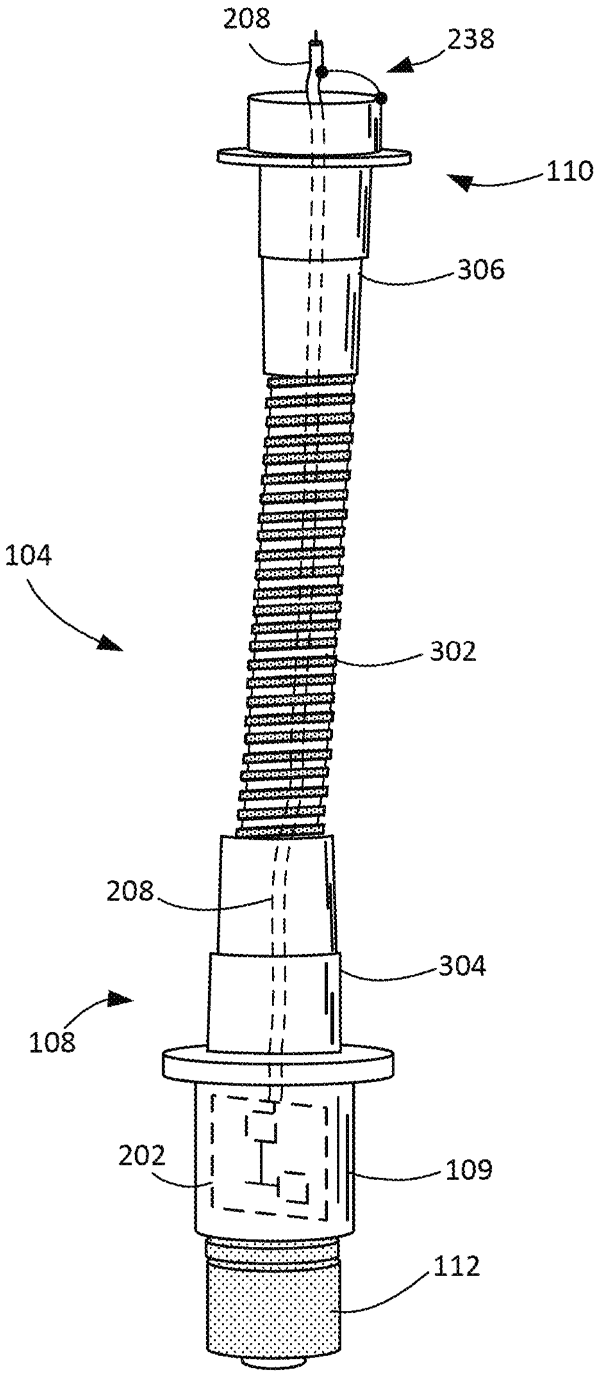
FIG. 3 is a perspective view of a portion of the antenna system shown in FIG. 1 which is useful for understanding certain embodiments of a high-band section of the antenna system.

In some embodiments, the first radiating element 104 can be comprised of a rigid metal tube formed of a conductive material such as copper or aluminum. However, it can be advantageous to instead form the first radiating element of a conductive metal gooseneck structure. Gooseneck structures are a well-known type of semi-rigid tubular member which can be bent or flexed to a set condition having a desired curvature and thereafter remain in the set condition. Forming the first radiating element of a semi-rigid gooseneck structure can be advantageous as it allows the antenna system to be adjusted in shape for the convenience, comfort and/or safety of the user. It also allows a position of the antenna to be adjusted for optimized signal transmission and reception. The hollow tubular configuration of a gooseneck structure allows a shielded transmission line (e.g., a flexible coaxial transmission line) to extend through an interior lumen defined by the tubular gooseneck structure. Shown in FIG. 3 is an embodiment of a first radiating element 104 which is comprised of a conductive gooseneck tubular member 302. In the embodiment shown in FIG. 3, the gooseneck tubular member includes conductive end caps 304, 306 respectively disposed at the proximal end 108 and distal end 110 of the first radiating element 104. FIG. 3 also depicts a connection 238 between the distal end 110 of the element and the shield of the shielded transmission line 208. Also shown in FIG. 3 is the base housing 109, antenna feed 112, base circuit 202 and shielded transmission line 208.

Referring once again to FIG. 2, shielded transmission line 208 communicates RF energy from the diplexer in base circuit 202 to the adaptive low-band antenna system 107. Included in the adaptive low-band antenna system 107 is a boundary control unit 214, a low-band circuit 216, the second radiating element 106, and a plurality of switches $\mathbf{218}_1$, $\mathbf{218}_2$, . . . $\mathbf{218}_n$. One or more of the various components of the low-band antenna system 107 can be disposed within the low-band housing 113.

In some scenarios, the boundary control unit 214 can comprise a ferrite choke 220 and an electronically controlled switch 222. In some scenarios, the electronically controlled switch 222 can be a single pole single throw (SPST) switch which transitions between an on and off switch condition responsive to a control signal from the low band circuit 216. First and second switched terminals of the electronically controlled switch 222 are connected to the shield of the shielded transmission line 208 on opposing sides of the ferrite choke 220. These connections are most clearly illustrated in FIG. 5, which shows the connections of switched terminals 226*a*, 226*b* to the shield 224 of transmission line 208. When the electronically controlled switch 222 is in the "off" condition it forms an open circuit between switched terminals 226*a*, 226*b*, and when in the "on" condition it forms a direct connection between switched terminals 226*a*, 226*b*.

The purpose of the boundary control unit 214 is to provide a mechanism for selectively preventing a flow of RF current in the shield 224 of the shielded transmission line 208. When the boundary control unit 214 is in an "on" condition (i.e., switch 222 closed) RF current can flow in the shield 224 and the conductive gooseneck tubular member 302 because the ferrite choke 220 is bypassed by the switch. Conversely, when the boundary control unit 214 is in an "off" condition (i.e., switch 222 open) RF current cannot flow in the shield part of the shielded transmission line because it is blocked by the ferrite choke 220. This arrangement facilitates a controllable RF boundary condition at the location of the ferrite choke, while also facilitating a DC ground connection at all times to keep the electronics powered. In a first operating mode in which the first radiating element 104 is in use, the adaptive low-band antenna system 107 can be effectively isolated from any high-band RF energy which may be coupled through the shield 224. In a second operating mode in which the second radiating element 106 is in use, the ferrite choke is bypassed so that RF currents associated with low band RF energy can be communicated to and from the adaptive low band antenna system 107. Further, in this second operating mode, the shield 224 of the shielded transmission line 208 and radiating element 104 (e.g., the conductive gooseneck tubular member 302) can serve as a part of a counterpoise for the second radiating element 106. This counterpoise function is facilitated by connection 238 between the distal end 110 of the element and the shield of the shielded transmission line 208. In some scenarios, this counterpoise can also include a chassis of a transceiver to which the antenna system 100 is connected.

The low-band circuit 216 determines the on or off condition of switch 222. The low-band circuit 216 also controls switch positions and connections made by electronically controlled switches $\mathbf{218}_1$, $\mathbf{218}_2$, . . . $\mathbf{218}_n$. The purpose of the electronically controlled switches $\mathbf{218}_1$, $\mathbf{218}_2$, . . . $\mathbf{218}_n$ is to selectively control RF current distribution in the second radiating element 106. According to one embodiment, the switches $\mathbf{218}_1$, $\mathbf{218}_2$, . . . $\mathbf{218}_n$ allow one or more turns 122 of the second radiating element 106 to be effectively bypassed. Bypassing the one or more turns 122 involves forming a relatively short bypass electrical connection from a feed location 229 adjacent to the proximal end 114 of the second radiating element to one of the turns 122 of the second radiating element 106 that is intermediate of the proximal and distal ends of the second radiating element. This bypass electrical connection allows RF energy to bypass one or more of the turns 122 and effectively changes the electrical length of the radiating element 106 so as to vary its resonant frequency. The electrical length of the radiating element 106 can be varied so that it exhibits a desired resonance characteristic at a particular frequency. In this way, the efficiency of the second radiating element 106 can be improved.

For example, a switch pole 230 of switch $\mathbf{218}_1$ can be connected directly to a feed location 229 adjacent to the proximal end 114 of the second radiating element 106. In such a scenario, setting switch $\mathbf{218}_1$ to switch position 231 will then effectively bypass the first two turns 122 of the radiating element 106. Setting switch $\mathbf{218}_1$ to switch position 232 will effectively bypass the first four turns 122 of the radiating element 106. The first switch $218_1$ can also provide a connection between feed location 229 and a pole 234 of a second switch $218_2$. The second switch $218_2$ can then be used to bypass certain turns 122 of the second radiating element 106. For example, setting switch $218_2$ to switch position 236 will effectively bypass the first nine turns 122 of the radiating element 106. Additional switch elements can be used in a similar way to bypass as many turns 122 of the radiating element as may be needed for operating at a particular frequency in the low band.

From the foregoing it will be understood that forming a relatively short bypass electrical connection from the feed location 229 to one of the turns 122 can involve one or more plurality of switches $218_1$, $218_2$, . . . $218_n$. To facilitate the necessary bypass electrical connections, various switching network topologies are possible. However, it is advantageous when forming such connections to minimize and parasitic reactances. For example, such parasitic reactances can be formed by conductive leads that are longer than necessary resulting in excess inductance and/or which extend needlessly close or in alignment with other conductors in a way that may result in parasitic capacitance. The potential for parasitic reactances can be further minimized by connecting two or more of the switches in a daisy chain for purposes of establishing connections to the turns 122. For example, the switches can be connected sequentially in series (e.g., as shown FIG. 2) for purposes of forming the bypass electrical connections. Such an arrangement can advantageously minimize one or more parasitic reactances associated with a plurality of electrical leads used to facilitate the various necessary bypass electrical connections.

Figure 4:
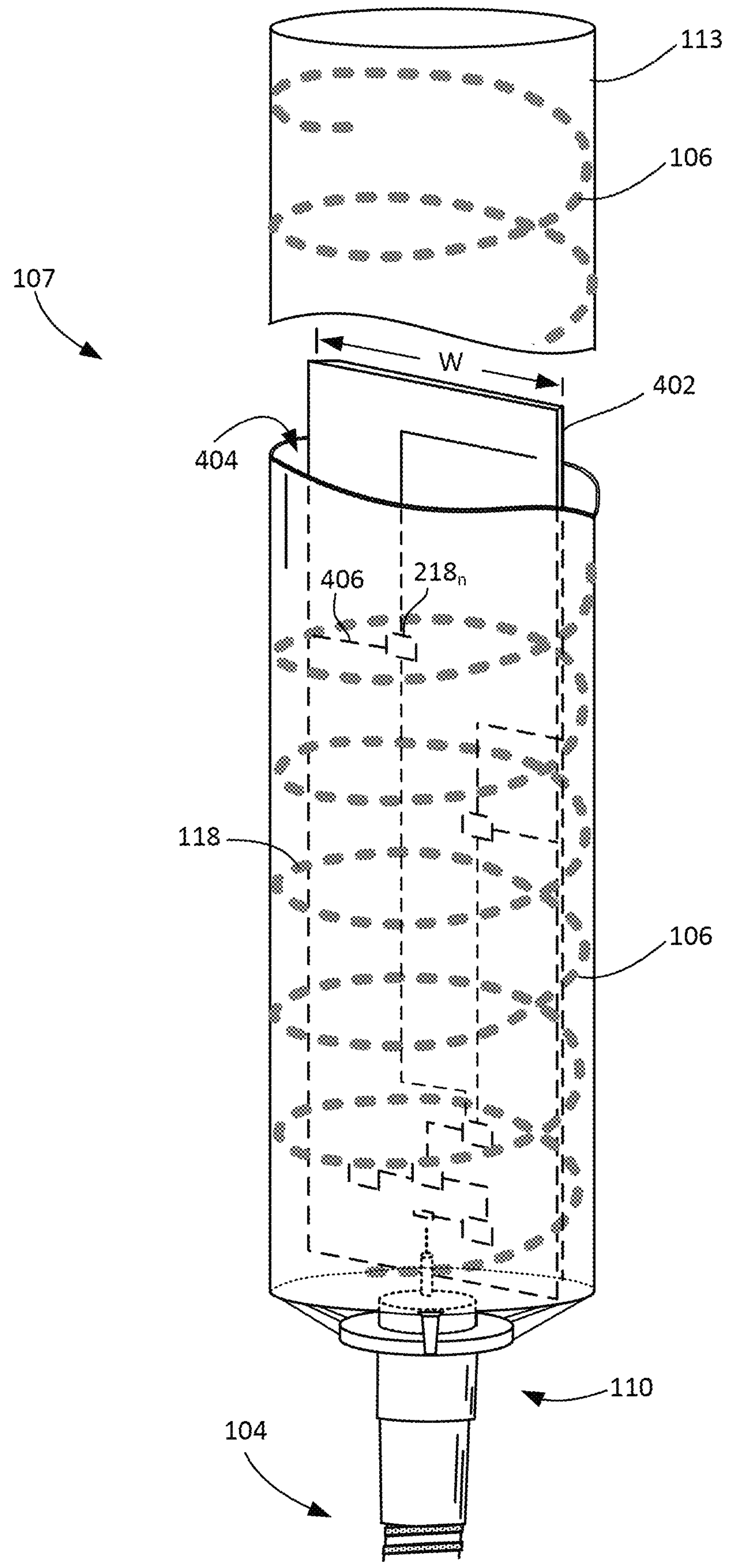
FIG. 4 is a perspective view of a portion of the antenna system shown in FIG. 1 which is useful for understanding certain embodiments of a low-band section of the antenna system.

In some scenarios, at least a portion of the low-band circuit 216 can be disposed on a printed wiring board. Such a configuration is illustrated in FIG. 4 which shows a printed wiring board 402 disposed in a lumen 404 defined within both the low-band housing 113 and the helical member 118 which comprises the second radiating element 106. In some embodiments the printed wiring board 402 can have a width W that approximates the inner diameter of the helical member 118. Such a configuration can advantageously allow one or more conductive traces 406 that are formed on the printed wiring board 402 to provide direct connections between switch terminals of the one or more switches $218_1$, $218_2$, . . . $218_n$ and the turns 122 of the helical member 118. This arrangement can also allow the printed wiring board 402 to serve as a support structure that is configured to help support the helical member 118.

Figure 5:
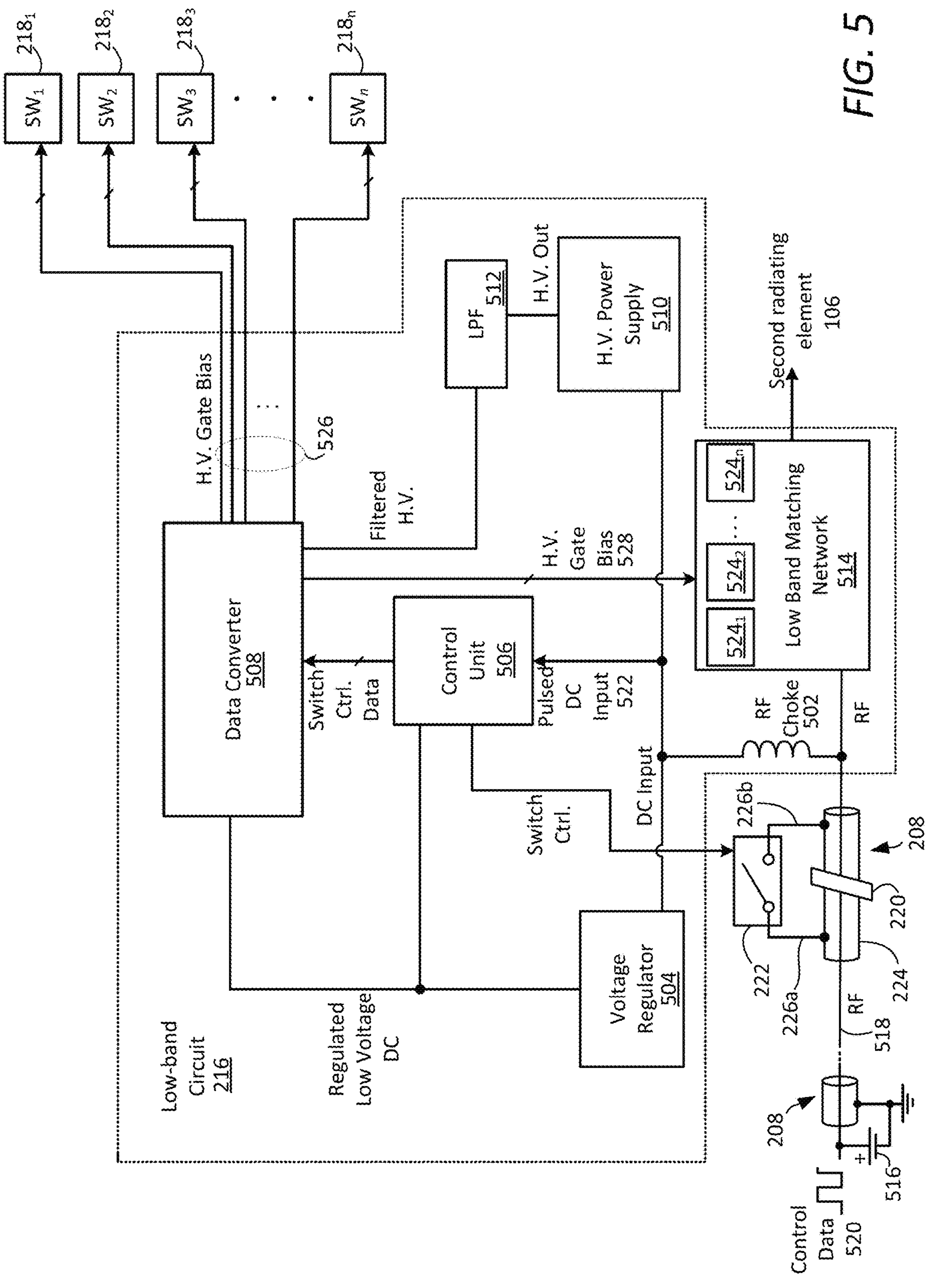
FIG. 5 is a schematic diagram which is useful for understanding a low-band circuit in certain embodiments of the antenna system of FIG. 1.

An embodiment of the low-band circuit 216 will now be disclosed with reference FIG. 5. The low-band circuit 216 includes an RF choke 502, a voltage regulator 504, a control unit 506, a data converter 508, a high-voltage power supply 510, a low-pass filter 512, and a low-band matching network 514. Low-band RF energy is communicated between the shielded transmission line 208 and the low band radiating element 106 through the low-band matching network 514. The low-band matching network 514 may comprise one or more electronically controlled switches $524_1$, $524_2$, . . . $524_n$. Electrical power for operating the low-band circuit 216 is provided through the shielded transmission line 208. A transceiver 102 can apply a DC voltage (e.g., DC voltage 516) to a shielded conductor 518 of the shielded transmission line 208. The RF choke 502 passes the incoming DC voltage to the voltage regulator 504 while blocking any RF that may be present on the shielded conductor 518.

The voltage regulator 504 uses the DC voltage from the RF choke 502 to provide a regulated low voltage DC output. The regulated low voltage DC can be used to power certain components on the low-band circuit 216 including the control unit 506 and the data converter 508. The control unit 506 facilitates overall control of the low-band antenna system. The control unit 506 can be any suitable processing element capable of carrying out the various antenna control functions described herein. The control unit 506 can comprise one or more components such as a processor, an application specific circuit, a programmable logic device, or other circuit programmed to perform the functions described herein. The control unit 506 can be realized in one computer system or several interconnected computer systems. Any kind of computer system or other apparatus adapted for carrying out the methods described herein is suited. A typical combination of hardware and software for implementing the control unit 506 can be a microcontroller which includes a processor, memory and input/output (I/O) peripherals on a single chip. The I/O peripherals can include one or more analog and/or digital interface circuits to facilitate the various control functions described herein. One or more sets of instructions for carrying out the operations described herein can be stored completely or partially in one or more of the memory of the microcontroller.

The control unit 506 can be configured to perform one or more control functions in response to control data signals received from a transceiver (e.g., transceiver 102) which may be connected to the antenna system 100. The control signals or data from the transceiver can be communicated to the control unit 506 using any suitable wired or wireless communication link. According to one aspect, control data 520 can be communicated from a transceiver (e.g., transceiver 102) to the control unit 506 as serial data using the shielded transmission line 208. For example, a pulsed DC voltage comprising serial control data can be applied to the shielded conductor 518. This pulsed DC voltage can be injected onto the shielded conductor 518 by the transceiver. For example, the transceiver could use an RF choke (similar to choke 502) to inject a pulsed DC voltage comprising the digital data signal onto the shielded conductor 518. The pulsed DC voltage 522 can be coupled to an input data interface of control unit 506. The control unit 506 decodes the pulsed DC voltage 522 as incoming serial data to determine one or more antenna operations which are specified by the transceiver.

High voltage power supply 510 converts low voltage DC power from RF choke 502 to a higher magnitude DC voltage suitable for operating one or more electronically controlled switches (e.g., switches $218_1$, $218_2$, . . . $218_n$). For example, the high voltage power supply 510 can be configured to convert a 5 volt DC input to an 85 volt DC output. To facilitate this voltage conversion, the high voltage power supply 510 may be comprised of a switching type power supply. The output of the high voltage power supply 510 can be coupled to a low-pass filter 512 which filters out switching noise and harmonics which may be present in the high voltage output. In some scenarios, the high voltage DC output can also be used to control certain electronically controlled switches $524_1$, $524_2$, . . . $524_n$ that are present in the low-band matching network 514.

The filtered high voltage output from the low-pass filter 512 is coupled to the data converter 508. In some scenarios, the data converter 508 is a conventional low-voltage to high-voltage serial-to-parallel converter with a plurality of latched high-voltage push-pull outputs which receives serial digital switch control data inputs from the control unit 506 to selectively apply high voltage to one or more parallel high-voltage gate bias control lines 526, 528. Accordingly, the data converter 508 selectively applies the high voltage to operate one or more of the electronically controlled switches $218_1$, $218_2$, . . . $218_n$ and $524_1$, $524_2$, . . . $524_n$ in response to digital data control signals received from control unit 506.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. An adaptive tunable antenna system, comprising a first radiating element having an elongated length extending from a first proximal end, adjacent to an antenna feed, to a first distal end;

a second radiating element extending from the first distal end and comprising a helical member extending along a central axis from a second proximal end to a second distal end and defining a plurality of turns;

a diplexer configured to frequency multiplex high-band RF energy between the antenna feed and the first radiating element, and low-band RF energy, having a lower RF frequency than the high-band RF energy, between the antenna feed and the second radiating element;

a low-band circuit at least partially disposed in an internal lumen defined by the helical member and configured to selectively bypass one or more of the plurality of turns in response to a control signal by coupling low-band RF energy from an end feed point of the second radiating element adjacent the second proximal end, to one or more of the plurality of turns intermediate of the second proximal end and the second distal end.

2. The antenna system of claim 1, wherein the first radiating element is comprised of a tubular member having a central bore extending along the elongated length.

3. The antenna system of claim 2, wherein the tubular member is a gooseneck structure.

4. The antenna system of claim 2, further comprising a high-band matching circuit coupled to a high-band port of the diplexer and to the first radiating element, the high-band matching circuit configured to facilitate an impedance match between the first radiating element and a transceiver when connected to a feed point.

5. The antenna system of claim 4, wherein the diplexer and the high-band matching circuit are both disposed in a base housing disposed at the first proximal end.

6. The antenna system of claim 2, further comprising a shielded transmission line coupled to a low-band port of the diplexer, the shielded transmission line extending through the central bore and connected to the low-band circuit, wherein a shield of the shielded transmission line is connected directly to the distal end of the first radiating element.

7. The antenna system of claim 6, further comprising a boundary control unit disposed along a portion of the shielded transmission line configured to selectively allow RF energy to be coupled to the low-band circuit through the shielded transmission line when in a first condition and prevent coupling of RF energy to the low-band circuit in the second condition.

8. The antenna system of claim 7, wherein the low-band circuit is comprised of a low-band control unit and a plurality of switches which are responsive to the low-band control unit to bypass one or more of the plurality of turns.

9. The antenna system of claim 8, wherein the plurality of switches are connected sequentially in a series configuration whereby one or more parasitic reactances associated with a plurality of electrical leads are minimized.

10. The antenna system of claim 8, wherein the boundary control unit is configured to transition between the first and second condition responsive to the low-band control unit.

11. The antenna system of claim 8, wherein the low-band circuit includes an RF choke connected to a shielded conductor of the shielded transmission line to couple a DC supply voltage, when present on the shielded conductor, to the low-band circuit.

12. The antenna system of claim 11, wherein the low-band control unit is configured to monitor the DC supply voltage to detect serial voltage pulses comprising the control signal which are present on the shielded conductor.

13. The antenna system of claim 8, wherein the low-band circuit includes a low-band matching network responsive to the low-band control unit and facilitates impedance matching of the second radiating element to a transceiver when the transceiver is connected to the antenna feed.

14. The antenna system of claim 1, wherein the helical member is disposed within a low-band housing comprising a radome.

15. An adaptive tunable antenna system, comprising a first radiating element having an elongated length extending from a first proximal end, adjacent to an antenna feed, to a first distal end includes a central bore extending along the elongated length;

a second radiating element extending from the first distal end and comprising a helical member extending along a central axis from a second proximal end to a second distal end and defining a plurality of turns;

a diplexer configured to frequency multiplex high-band RF energy between the antenna feed and the first radiating element, and low-band RF energy, having a lower RF frequency than the high-band RF energy, between the antenna feed and the second radiating element;

a shielded transmission line coupled to a low-band port of the diplexer, the shielded transmission line extending through the central bore and connected to the low-band circuit, wherein a shield of the shielded transmission line is connected directly to the distal end of the first radiating element a low-band circuit including a low-band control unit at least partially disposed in an internal lumen defined by the helical member and configured to selectively bypass one or more of the plurality of turns in response to a control signal by coupling low-band RF energy from an end feed point of the second radiating element adjacent the second proximal end, to one or more of the plurality of turns intermediate of the second proximal end and the second distal end.

16. The antenna system of claim 15, further comprising a boundary control unit disposed along a portion of the shielded transmission line configured to selectively allow RF energy to be coupled to the low-band circuit through the shielded transmission line when in a first condition and prevent coupling of RF energy to the low-band circuit in the second condition.

17. The antenna system of claim 16, wherein the boundary control unit is configured to transition between the first and second condition responsive to the low-band control unit.

18. The antenna system of claim 16, wherein the low-band circuit includes an RF choke connected to a shielded conductor of the shielded transmission line to couple a DC supply voltage, when present on the shielded conductor, to the low-band circuit.

19. The antenna system of claim 18, wherein the low-band control unit is configured to monitor the DC supply voltage to detect serial voltage pulses comprising the control signal which are present on the shielded conductor.

20. The antenna system of claim 16, wherein the low-band circuit is comprised of a plurality of switches which are responsive to the low-band control unit to bypass one or more of the plurality of turns.

21. The antenna system of claim 20, wherein the plurality of switches are connected sequentially in a series configuration whereby one or more parasitic reactances associated with a plurality of electrical leads are minimized.

* * * * *